United States Patent Office 2,891,881
Patented June 23, 1959

2,891,881

RECOVERY OF METALS

Albert L. Jaffe, Philadelphia, Pa.

No Drawing. Application January 2, 1957
Serial No. 632,000

11 Claims. (Cl. 134—2)

This application is a continuation-in-part of my application No. 618,192 for Separation of Metals, filed October 25, 1956.

This invention relates to the recovery of scrap metals. More particularly, it relates to the recovery of copper based articles, such as radiators and wires, which are presented for recovery coated or otherwise in contact with relatively low melting point metals, such as solder, tin, Babbitt metal, zinc, antimony and their alloys and similar low melting point metals and alloys. Articles of manufacture which are to be subjected to this recovery process may also be presented for recovery associated with other materials, e.g., tinned or untinned wire which is presented coated with insulation. This insulation is usually polyethylene, polyvinyl chloride (PVC), or rubber which may or may not be combined with fabric. This invention further relates to the recovery of aluminum, particularly aluminum wire, which is presented for recovery associated with the low melting point metal or alloy or insulating materials as described above.

When copper or aluminum objects, such as those described above, are presented for recovery, the object is to remove the associated foreign metals, alloys and other materials in as rapid, inexpensive and thorough a method as possible whereby copper or aluminum will be made available in the purest form possible.

The principal present method for removing solder (a tin-lead alloy) from copper or copper-alloy bases such as, for example, automobile radiators, has been "sweating" the radiator in ovens and vibrating to remove the solder. Such a method is disclosed in U.S. Patent 1,826,755. From a view point of reclaiming the copper, the sweating process has disadvantages. It is difficult to thoroughly remove all the solder material. If the temperature is high enough to remedy this, the danger of alloying the tin component with the copper is encountered. This makes the copper brittle and also decreases its scrap value. Furthermore, oxides of both the copper base and the low melting point metals are produced resulting in a lower grade copper scrap.

Where, throughout this specification and claims, the word copper or copper-based is used, it is meant to include all copper base alloys such as brass (85% copper, 15% zinc) or bronze (copper and tin) where a major portion of the alloy is copper.

It is an object of this invention to provide a method for the inexpensive removal of foreign, relatively low melting point metals and alloys and insulating materials from copper, copper based and aluminum articles of manufacture whereby a suitable scrap copper, copper alloy, or aluminum metal may be obtained.

It is an object of this invention to remove tin, lead, solder and Babbitt metal from copper and brass articles.

It is another object of this invention to remove insulating materials and relatively low melting point metals from copper, copper alloy and aluminum bases by a method comprising immersion in a bath of fused sodium hydroxide producing a high-grade scrap.

It is yet another object of this invention to remove insulating materials and relatively low melting point metals by immersion in a bath of fused sodium hydroxide and alkali metal hydrides and alkali metal chlorates, nitrates, chromates, manganates, permanganates, peroxides and dichromates.

These and other objects will be made clear in the following detailed description.

Some of the copper and copper alloy articles from which the low melting metals may be removed are tin-plated copper wire, light copper spouting (light gauge roofing materials), sheet copper, painted and plated yellow brass stock, nickel-plated brass, plated or soldered copper tubing, electrotype shells, honeycomb radiators, nickel-plated red brass spigots, valves and pipes, and babbitted bearings. These articles are not to be construed as exhaustive of this invention's uses but are merely illustrative of some of the many common commercial uses.

Copper wire plated with tin may be stripped of its tin by the following process according to this invention. The copper wire, without any prior heating or other treatment is immersed in a bath of sodium hydride and sodium hydroxide. The proportion of sodium hydride in the bath should be at least 1.0% and preferably at least 1.6%–2.0%. The proportion of NaH may be as high as 20.0%, but about 2.0% is workable and commercially feasible. A NaH concentration of only 0.5% has been found unsatisfactory. The temperature of the bath should be between about 675° and 775° F. preferably in the range of 700° to 750° F. The temperature and concentration conditions of the bath are the same as in the prior art disclosures for pickling or de-scaling ferrous materials. The tin-plated copper wire is immersed in the bath for a period of approximately 10 to 15 minutes. This time may vary depending on the conditions, such as the thickness of the plate. When withdrawn and washed or rinsed with hot water to remove the sodium hydroxide coating or "phlegm," the copper was found to be clean and to be of 99.98% purity.

It has been known to use sodium hydride in a fused bath of sodium hydroxide to remove oxide scale from steel, iron, and steel alloys such as stainless steel. Such a process is disclosed for example, in U.S. Patent No. 2,377,876. The materials producing the sodium hydroxide-sodium hydride bath are marketed by several companies. For example, the E.I. du Pont de Nemours and Co., Inc. supplies the appropriate chemicals and information as to the requisite apparatus. The du Pont process is described as being applicable to the removal of scale from many metals and alloys such as nickel, Monel, Stellite, titanium, and cobalt bearing alloys. Other producers of hydride de-scaling materials are Metal Hydrides, Inc., Beverly, Mass., and U.S. Industrial Chemicals Co., New York, N.Y.

The sodium hydride-sodium hydroxide bath is generally prepared as follows: A container of sodium hydroxide, equipped with heating elements, is heated to a temperature at which the sodium hydroxide fuses. Associated with the container is a generator box, into which metallic sodium is charged and into which hydrogen is bubbled. Sodium hydride is produced and mixes into the sodium hydroxide bath. The concept of the production of this hydride bath is not deemed part of the present invention and the use of other existing methods and apparatus for NaH production is contemplated. The apparatus and method for hydride bath production is well known in the art and it is not deemed necessary to describe this method and apparatus in detail in this disclosure. Methods and apparatus for the provision of sodium hydride baths are disclosed, for example, in U.S.

Patent No. 2,353,026, the booklet entitled "Du Pont Sodium Hydride De-scaling Process," published by Du Pont Company or a Technical Bulletin 507C published by Metal Hydrides, Inc., Beverly, Mass. The bath should be substantially anhydrous.

*Example 1*

Copper wire coated with tin was placed, without prior treatment, into a fused bath of 1.8% NaH in NaOH. The bath was maintained at a temperature of 750° F. After 10 minutes in the bath, the wire was withdrawn and found to be completely clean of tin. The treated copper was 99.98% pure.

*Example 2*

200 pounds of tin coated copper wire without prior treatment was immersed in a fused bath of 1.6% NaOH at 720° F. After 10 minutes the wire was withdrawn, flushed or rinsed with hot water to remove the coating or "phlegm" of NaOH. The purity of this copper wire was found to be 99.9%. This process was then repeated in the same fused bath and was found to be again successful.

It was feared in Examples 1 and 2 that the tin would go into solution in the NaOH and therefore recoat subsequently treated samples but this recoating was found not to occur. It is not completely understood why this process should remove the tin plate so efficiently. Merely exposing tin-plated copper wire to indirect heat of temperature equal to that of Examples 1 and 2 does not produce completely de-tinned copper wire.

Where copper or brass articles totally or partially coated with solder are to be de-soldered it has been found that a preliminary step to the NaH bath is desirable. The article should first be subjected to indirect heat of approximately 900°. By indirect heat is meant heat supplied electrically or in any other manner wherein the work is not contacted by direct flame. The work is preheated at this temperature for a period of time which will vary depending on the character of the article to be treated (such as the thickness of solder), but it has been found that for an article such as a copper honeycomb radiator, one hour pre-heating is satisfactory.

After the pre-heating stage the work piece is transferred immediately to a bath of fused NaOH and NaH. The temperature and NaH concentration of the bath is the same as described above in connection with de-tinning copper wire.

The period of immersion in the fused bath may vary depending on the conditions (as the amount of material to be removed, the temperature of the bath, and the concentration of the bath). It has been found that for pieces such as soldered radiators a period of 10 to 20 minutes is satisfactory.

*Example 3*

A copper radiator, having soldered connections, was preheated in indirect, electric oven heat at 900° F. for one hour. The radiator was then immersed in a fused bath of NaOH with a 2.0% NaH at a temperature of 750° F. It was maintained in this bath for 20 minutes. The piece was then withdrawn, shaken, water quenched and hot water rinsed. The piece was then pickled for 10 minutes in 10% NHO₃ at room temperature, rinsed, and air dried.

*Example 4*

A copper radiator having soldered connections was preheated in indirect, electric oven heat at 900° F. for one hour. The radiator was then immediately immersed in a fused bath of NaOH with 1.8% NaH at a temperature of 750° F. It was maintained in this bath for 20 minutes. The piece was withdrawn, shaken, water quenched, and hot water rinsed. The piece was then pickled for 10 minutes in 10% NHO₃ at room temperature, rinsed, and air dried.

The copper reclaimed by means of Examples 3 and 4 tested to a purity of 99.90%. Substantially the same treatment as described in Examples 3 and 4 was performed on a work piece made of brass (approximately 85% copper, 15% zinc). After treatment, the brass piece also showed as complete freedom from lead and tin as did the copper work piece. The steps of quenching, rinsing, and acid pickling are not alleged to be novel per se. Such steps have often been performed in connection with sodium hydride descaling and in de-scaling in general. The acid treatment step brightens the reclaimed copper or copper alloy material, but is not an essential step to the inventive process herein desclosed.

In addition to soldered metal coatings, Babbitt metal (alloys of antimony, lead and tin) coatings may be successfully treated with this process. This class of alloys is used, for example, in bushings, bearings, and electrotype shells. It has been found that pre-heating electrotype shells with indirect heat at temperatures from 700° to 900° F. will result in the "sweating" of much of the white metal alloy from the copper shell, leaving a substantial remainder. Immediate immersion of the shell into a fused NaOH—NAH bath of the same range of temperature, strength and times as in the preceding examples, results in the complete removal of the white metals from the copper piece.

Attempts to completely remove lead, tin, antimony and various alloys from copper or copper alloy bases by heatings alone are not completely satisfactory. If the heating is of high enough temperature and of long enough duration to effectively remove all the low melting metal, undesirable results may occur. The low melting metals may form a surface alloy with the copper thus greatly reducing the commercial value thereof. Another possibility is the production of oxides of copper on the surface, which also greatly down grades the commercial value, resulting in "burnt copper."

If the heating conditions are moderated to avoid these problems, the low melting metals are not completely removed from the base. They often melt out into a thin adherent "film" on the base metal. In the aspects of the present invention wherein a pre-heating step is used, the material need not be heated to the point of danger of alloying or burning. Pre-heating to a point at which some coating still remains on the base and then relying on the hydride bath to remove the remainder of the coating produces a clean copper. As indicated above, for example, a temperature of about 900° F. is satisfactory for soldered copper articles. The exact pre-heat temperature is not highly critical, but the temperature range is important. A pre-heat temperature of 600° F. was found wholly unsatisfactory; a temperature of 900° F. was completely satisfactory in the case of solder. For Babbitt metal, a range of about 700° F. to 900° F. is satisfactory.

A reason that indirect heating is preferred for the pre-heating step is that direct heat may produce hot spots which tend to oxidize or alloy with the base material.

It is not completely understood why the present pre-heating and hydride bath process is so successful. It has been suggested that in the pre-heating step, some low melting material is simply melted away, and that thereafter a "film" or other formation of the coating metal remains adherent to the copper or copper alloy base, and is retained or dammed by a crust of low melting alloy oxide which prevents flow of the inner film. It is thought that upon immersion in the hydride bath, the oxide crust may be reduced, and since high temperature is present in the bath, the remaining "film" is free to flush away.

It is understood, of course, that this is merely a hypothesis. In the case of immersion of tin-coated articles without pre-heating, another explanation must be found. It may be that the hydride bath is effective when the coating is thin, either initially as in the case of tinned wire, or because of the pre-heating ("sweating") step.

The term "coating" is understood to mean complete or partial covering of the copper or copper alloy base metal by a relatively low melting-point metal or alloy.

While sodium hydride is commercially feasible, other metal hydrides, as lithium hydride and potassium hydride may also act under conditions of temperature and concentration suitable to their known chemical properties.

It has been found that although the use of sodium hydroxide in combination with sodium hydride or other alkali metal hydrides is an efficient scrap recovery process, caustic alkali, such as sodium hydroxide, alone will also perform the desired function. The plain, fused, substantially anhydrous caustic bath may be used in the same manner as that illustrated in Examples 1–4 except that the time of treatment is substantially lengthened.

The term "low melting-point metals" is understood to mean the metals and their alloys.

The scope of this invention is to be determined by the appended claims and not by the specific examples and illustrations set forth in the description.

*Example 5*

Copper wire coated with tin was placed without prior treatment into a fused bath of substantially anhydrous fused NaOH. The bath was maintained at a temperature of 750° F. After 30 minutes, the wire was withdrawn and found to be completely free of tin. The treated copper tested to 99.98% purity.

The same temperature and other conditions as described above in connection with a sodium hydroxide-sodium hydride bath are applicable to the plain sodium hydroxide bath with the proviso that a substantially longer period of immersion is required to obtain equal results; furthermore, the operating temperature of the bath is not limited by the presence of sodium hydride. It is necessary when using sodium hydride, to maintain the bath temperature no higher than those described above in order to avoid loss of the hydride from the solution. When using caustic alkali alone, the upper temperature limit is limited only by the physical properties of the caustic alkali and may therefore be substantially higher. It has been found that a practicable minimum temperature is 750° F. While sodium hydroxide is commercially feasible, other alkali metal hydroxides, such as potassium hydroxide, may be used.

In addition to using a caustic alkali alone or a mixture of a caustic alkali and an alkali hydride, this invention contemplates the use of a caustic alkali bath with any one of many substantially anhydrous oxidizing agents. Sodium hydroxide with an oxidizing agent is available from the Hooker Electrochemical Company, Niagara Falls, N.Y., and is known under the trade name of Virgo Descaling Salt.

A copper or aluminum article associated with a relatively low melting-point metal or alloy, such as tin, solder or Babbitt metal, is immersed in a fused substantially anhydrous bath comprising a caustic alkali (preferably sodium hydroxide) and an oxidizing agent. Suitable oxidizing agents are alkali metal and alkaline earth chlorates, nitrates, manganates, permanganates, chromates, dichromates and peroxides. Representative of these agents are sodium nitrate, sodium chlorate and potassium chlorate. The proportion of oxidizing agent may be from 1–20% and preferably 5–10%. The temperature may vary within wide limits, preferably from about 600° F.–1000° F. and preferably should be about 900° F. The chemical compositions and their operating temperatures per se are not alleged to be new. They are known in the art and are disclosed in connection with a different process in U.S. Patent Re. 22,887.

The article to be recovered is immersed in the bath for a period sufficient to completely remove the foreign metal or alloy. The time of immersion has been found to be about 5–15 minutes, depending on the article. The article may be water washed and dipped in diluted non-oxidizing acid, such as hydrochloric acid, to complete the removal of any undesirable material, including caustic alkali "phlegm."

*Example 6*

A length of tinned copper wire was immersed for 5 minutes in a fused bath of 10% sodium nitrate in NaOH at a temperature of about 1000° F. After 5 minutes in the bath, the wire was withdrawn and found to be completely free of tin.

*Example 7*

A length of tinned copper wire was immersed in a fused bath of 10% sodium nitrate at a temperature of about 900° F. After about 10 minutes, the wire was withdrawn from the bath and was found to be completely free of tin.

It was heretofore believed that such baths could not be used to remove low melting metals and metal alloys. It was believed that the tin would go into some form of solution in the bath and rapidly render it ineffective. It has been found that, in fact, the solution retains its effectiveness for repeated dippings. The use of a sodium hydroxide-sodium nitrate bath to recover scrap is somewhat less expensive and less hazardous than a sodium hydroxide-sodium hydride bath and more efficient and faster than a plain sodium hydroxide bath.

Much wire scrap is presented for recovery with insulation on it. Such insulation is usually polyethylene, polyvinyl chloride or combinations of these two in discrete layers of rubber. It has been found that such insulated wire may be immersed in any of the baths disclosed herein, whether or not it also has a coating of tin or other low melting metal and is removed as clean, high purity copper or aluminum wire as the case may be.

On immersion in the bath, the insulation is rapidly destroyed. The nature of this destruction depends on the material comprising the insulation, being either a burning or melting process. The desired result, removal of the insulation from the metal to be recovered, is accomplished regardless of the type of insulation. The following examples are representative of application of the present process to the removal of insulation. Similar results are obtained with all of the baths described herein.

*Example 8*

A length of copper wire, covered only with insulation consisting of a layer of polyethylene and a layer of polyvinyl chloride, was immersed in a bath of fused, substantially anhydrous 90% sodium hydroxide and 10% sodium nitrate at a temperature of 950° F. The wire was stripped clean in 1 minute, 40 seconds.

*Example 9*

A length of copper wire, tinned and insulated with a layer of polyethylene and a layer of polyvinyl chloride, was immersed in a bath of fused, substantially anhydrous 90% sodium hydroxide and 10% sodium nitrate at a temperature of 950° F. The wire was stripped clean of both insulation and tin in 5 minutes.

The increased time in Example 9 was required to remove the tin. Of course, in this process, the insulation is lost and cannot be recovered. This it not too serious a drawback, since the scrap price of the metal is far higher than the scrap value of the plastic or other insulation and the rapidity and ease of the process justifies the loss of the insulation.

The problem of removing insulating coatings from wire has been a serious one in the scrap recovery industry and the provision of the present method by which insulating coatings and foreign low melting metals and alloys are simultaneously removed from copper, copper alloys and aluminum based metals is a significant economic improvement in the art of scrap recovery. It is understood that the essence of this invention is the use of the described baths for the purpose of removing metals and insulation from scrap. The baths themselves are admittedly known in the art, but have always heretofore been used solely for the removal of scales and oxides from metals, never for the removal of metal itself.

The merit of this disclosure lies in the provision of a novel new use for the known baths; the removal of metal from a base of dissimilar metal and the removal of organic substances from a base of metal for the purpose of facilitating the recovery of scrap metal.

I claim:

1. The method of removing a coating comprising both a relatively low melting-point metal and organic insulation from articles made of material of the group consisting of copper and aluminum and mixtures thereof comprising immersing said articles in a bath comprising fused substantially anhydrous caustic alkali until said relatively low melting-point metals and organic insulation are removed, and then removing said articles from the bath, whereby a high grade scrap is obtained.

2. The method of removing a coating comprising both a relatively low melting-point metal and organic insulation from articles made of material of the group consisting of copper and aluminum and mixtures thereof comprising immersing said articles in a bath comprising fused substantially anhydrous caustic alkali containing a substantial but minor proportion of an oxidizing agent stable therewith, at a temperature of 600° F.–1000° F. until said relatively low melting-point metals and organic insulation are removed, and then removing said articles from the bath, whereby a high grade scrap is obtained.

3. The method as defined in claim 1 wherein the bath consists solely of fused substantially anhydrous caustic alkali.

4. The method as defined in claim 2 wherein the proportion of said oxidizing agent is from 1% to 20%.

5. The method as defined in claim 2 wherein the proportion of said oxidizing agent is from 5% to 10%.

6. The method as defined in claim 2 wherein said oxidizing agent is sodium nitrate.

7. The method of removing a coating of relatively low melting point metals from articles of the group consisting of copper and aluminum comprising immersing said articles in a bath comprising fused substantially anhydrous caustic alkali containing a substantial but minor proportion of an oxidizing agent stable therewith, at a temperature of 600° F. to 1000° F. until said relatively low melting point metals are removed, and then removing said articles from the bath, whereby a high grade scrape is obtained.

8. The method as defined in claim 7 wherein the proportion of said oxidizing agent is from 1% to 20%.

9. The method as defined in claim 7 wherein the proportion of said oxidizing agent is from 5% to 10%.

10. The method as defined in claim 7 wherein the oxidizing agent is sodium nitrate.

11. The method of removing a coating of organic insulation from articles of the group consisting of copper and aluminum comprising immersing said articles in a bath comprising fused substantially anhydrous caustic alkali containing a substantial but minor proportion of an oxidizing agent stabile therewith, at a temperature 600° F. to 1000° F. until said organic insulation is removed, and then removing said articles from the bath, whereby a high grade scrap is obtained.

No references cited.